US009198228B2

(12) United States Patent
Wippich

(10) Patent No.: US 9,198,228 B2
(45) Date of Patent: Nov. 24, 2015

(54) COMMUNICATION TERMINAL, METHOD FOR RECEIVING DATA AND COMPUTER PROGRAM PRODUCT

(75) Inventor: Wolfgang Wippich, Hersbruck (DE)

(73) Assignee: Intel Deutschland GmbH, Neubiberg (DE)

( * ) Notice: Subject to any disclaimer, the term of this patent is extended or adjusted under 35 U.S.C. 154(b) by 518 days.

(21) Appl. No.: 13/178,528

(22) Filed: Jul. 8, 2011

(65) Prior Publication Data

US 2012/0008721 A1 Jan. 12, 2012

Related U.S. Application Data

(60) Provisional application No. 61/362,327, filed on Jul. 8, 2010.

(30) Foreign Application Priority Data

Jul. 8, 2010 (DE) .......................... 10 2010 017 806

(51) Int. Cl.
H04L 27/06 (2006.01)
H04W 88/06 (2009.01)
H04W 68/02 (2009.01)
H04W 92/02 (2009.01)

(52) U.S. Cl.
CPC .............. H04W 88/06 (2013.01); H04W 68/02 (2013.01); H04W 92/02 (2013.01)

(58) Field of Classification Search
CPC ....................................... H03M 5/02
USPC ....................................... 375/340
See application file for complete search history.

(56) References Cited

U.S. PATENT DOCUMENTS

| 4,972,480 | A | * | 11/1990 | Rosen ............................. 380/46 |
| 5,852,630 | A | * | 12/1998 | Langberg et al. ............. 375/219 |
| 5,870,673 | A |   | 2/1999  | Haartsen |
| 5,884,188 | A |   | 3/1999  | Hayes, Jr. |
| 7,787,389 | B2 |   | 8/2010  | Chen et al. |
| 2003/0125073 | A1 | | 7/2003 | Tsai et al. |

(Continued)

FOREIGN PATENT DOCUMENTS

| CN | 1236532 A | 11/1999 |
| CN | 1572073 A | 1/2005 |

(Continued)

OTHER PUBLICATIONS

English abstract of JP 2000333238 A dated Nov. 30, 2000.

(Continued)

Primary Examiner — Shuwang Liu
Assistant Examiner — Helene Tayong

(57) ABSTRACT

A communication terminal may include a receiver configured to receive data via a first channel or via a second channel; and a controller configured to control the receiver such that it receives a part of first data from a first facility of a first network by means of the first channel in a first part of a period in which the transmission of the first data by the first facility overlaps the transmission of the second data by the second facility and that the receiver receives a part of the second data from the second facility by means of the second channel during a second part of the period so that the first part of the period and the second part of the period do not overlap and so that the part of the first data which is received in the first part of the period meets a predetermined criterion.

19 Claims, 7 Drawing Sheets

(56) References Cited

U.S. PATENT DOCUMENTS

| | | | |
|---|---|---|---|
| 2005/0048982 A1* | 3/2005 | Roland et al. .................. | 455/449 |
| 2006/0094441 A1 | 5/2006 | Beckmann et al. | |
| 2007/0275708 A1* | 11/2007 | Henderson .................... | 455/415 |
| 2008/0281908 A1* | 11/2008 | McCanne et al. ............. | 709/203 |
| 2009/0052389 A1 | 2/2009 | Qin et al. | |
| 2009/0312020 A1 | 12/2009 | Lee | |
| 2012/0275448 A1* | 11/2012 | Chin et al. .................... | 370/342 |

FOREIGN PATENT DOCUMENTS

| | | | |
|---|---|---|---|
| JP | 10107779 A | 4/1998 | |
| JP | 2000333238 A | 11/2000 | |
| JP | 2005525712 A | 8/2005 | |
| JP | 2001501056 A | 1/2011 | |
| KR | 20000035888 A | 6/2000 | |
| KR | 20100059804 A | 6/2010 | |
| WO | 2010/011951 A1 | 1/2010 | |

OTHER PUBLICATIONS

English abstract for JP 10-107779A dated Apr. 24, 1998.

Office action received for Chinese patent Application No. 201110234954.5, mailed on Aug. 26, 2013, 17 pages of Office action including 11 pages of English Translation.

Notice of Allowance received for Korean Patent Application No. 2013-0073503, mailed on Aug. 21, 2013, 3 pages of Notice of Allowance including 1 page of English Translation.

Office action received for Chinese patent Application No. 201110234954.5, mailed on Aug. 11 2014, 12 pages of Office action including 8 pages of English Translation.

Office action received for Chinese patent Application No. 201110234954.5, mailed on Jan. 27, 2014, 11 pages of Office action including 7 pages of English Translation.

Office action received for Japanese patent Application No. 2011-151278, mailed on Mar. 25, 2014, 2 pages of Office action only.

Office action received for Japanese patent Application No. 2011-151278, mailed on Jun. 4, 2013, 2 pages of Office action only.

Office action received for Japanese patent Application No. 2011-151278, mailed on Oct. 16, 2012, 7 pages of Office action including 4 pages of English Translation.

Office action received for Korean patent Application No. 2011-0068117, mailed on Jan. 17, 2013, 8 pages of Office action including 5 pages of English Translation.

Office action received for Korean patent Application No. 2011-0068117, mailed on May 24, 2013, 8 pages of Office action including 5 pages of English Translation.

Office action received for Korean patent Application No. 2011-0068117, mailed on Aug. 20, 2012, 4 pages of English Translation only.

* cited by examiner

COMMUNICATION TERMINAL, METHOD FOR RECEIVING DATA AND COMPUTER PROGRAM PRODUCT

CROSS-REFERENCE TO RELATED APPLICATION

The present application claims the priority of German patent application no. 10 2010 017 806.3-31 and of U.S. provisional application No. 61/362,327, both filed Jul. 8, 2010, the content of which is herewith in each case accepted herein in the full extent by reference.

TECHNICAL FIELD

Exemplary embodiments generally relate to a communication terminal a method for receiving data and to a computer program product.

BACKGROUND

Modern handsets for cellular mobile communication networks can support being equipped simultaneously with more than one subscriber chip card, for example with more than one SIM (Subscriber Identity Module) card for a GSM (Global System for Mobile Communication) communication system or more than one USIM (Universal Subscriber Identity Module) card for a UMTS (Universal Mobile Telecommunications System) communication system or a combination of such cards and can support in this manner being operated simultaneously in a plurality of cellular mobile communication networks.

In the case where such a handset, or generally such a subscriber communication terminal, only has one transmitting/receiving unit, however, problems can occur in the case where messages, for example paging messages, are transmitted simultaneously by different cellular mobile communication networks and the communication terminal is not capable of receiving all messages. For example in the case of paging messages, this can lead to the subscriber not being available for an incoming call request.

It is desirable, therefore, to enable data which are transmitted by a plurality of communication networks so that the data transmissions overlap at least partially, to be receivable.

SUMMARY

A communication terminal may include a receiver configured to receive data via a first channel or via a second channel; and a controller configured to control the receiver such that it receives a part of first data from a first facility of a first network by means of the first channel in a first part of a period in which the transmission of the first data by the first facility overlaps the transmission of the second data by the second facility and that the receiver receives a part of the second data from the second facility by means of the second channel during a second part of the period so that the first part of the period and the second part of the period do not overlap and so that the part of the first data which is received in the first part of the period meets a predetermined criterion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The following detailed description relates to the attached figures which show details and embodiments. These embodiments are described in such detail that the expert can execute the invention. Other embodiments are also possible, and the embodiments can be modified in a structural, logical and electrical regard without deviating from the subject matter of the invention. The various embodiments are not necessarily mutually exclusive, but various embodiments can be combined with one another so that new embodiments are produced.

Figure 1:
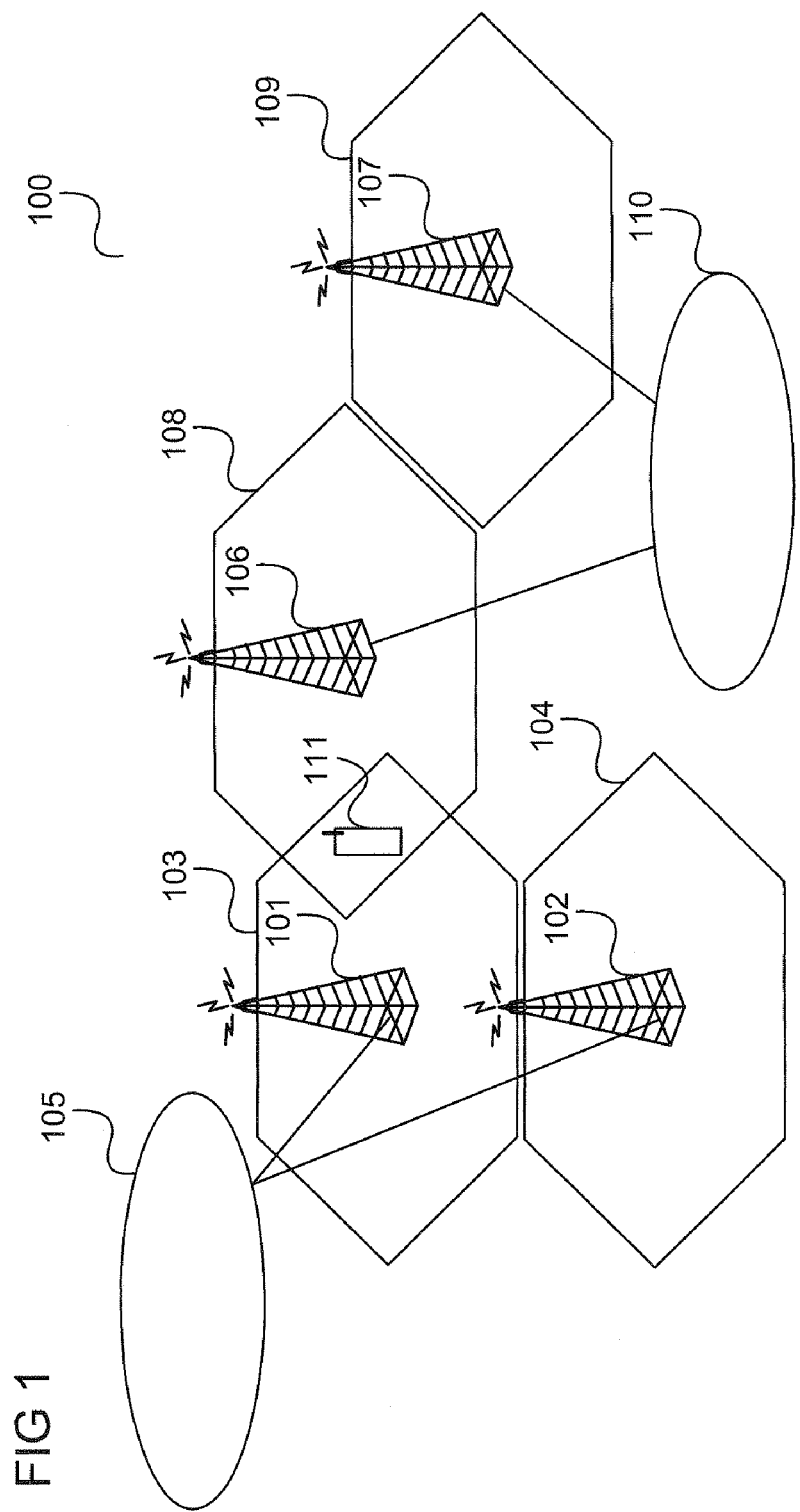
FIG. 1 shows a communication system according to one embodiment.

FIG. 1 shows a communication system 100 according to one embodiment.

The communication system 100 has components of a first communication network and a second communication network. For example, the first communication network has a plurality of base stations 101, 102, for example a first base station 101 and a second base station 102. The first base station 101 operates a first radio cell 103 and the second base station 102 operates a second radio cell 104. The first base station 101 and the second base station 102 are connected to a first core network 105 of the first communication network and can provide communication services for subscriber terminals which are located in the first radio cell 103 and in the second radio cell 104, for example a communication link to the first core network 105.

Analogously the second communication network has, for example, a plurality of base stations 106, 107, e.g. a third base station 106 and a fourth base station 107. The third base station 106 operates a third radio cell 108 and the fourth base station 107 operates a fourth radio cell 109. The third base station 106 and the fourth base station 107 are connected to a second core network 110 of the second communication network and can provide communication services, for example a radio link to the second core network 110, for subscriber terminals which are located in the third radio cell 108 or in the fourth radio cell 109.

In this example, a communication terminal 111 is located in the first radio cell 103 and in the third radio cell 108, i.e. in an area which is covered, i.e. supplied, both by the first base station 101 and also by the third base station 106. The communication terminal 111 can thus utilize both communication services which are offered by the first communication network and communication services which are offered by the second communication network. For example, the communication terminal 111 can register both in the first communication network (e.g. the first core network 105) and in the second communication network (e.g. the second core network 110). In this manner, the communication terminal 111 can receive, for example, calls by means of the first communication network, e.g., from other communication terminals which are connected to the first communication network and can receive calls by means of the second communication network, e.g. from other communication terminals which are connected to the second communication network.

For example, the communication terminal 111 has a plurality of subscriber chip cards, in other words subscriber modules so that it supports both a communication via the first communication network and via the second communication network. This is shown in FIG. 2.

Figure 2:
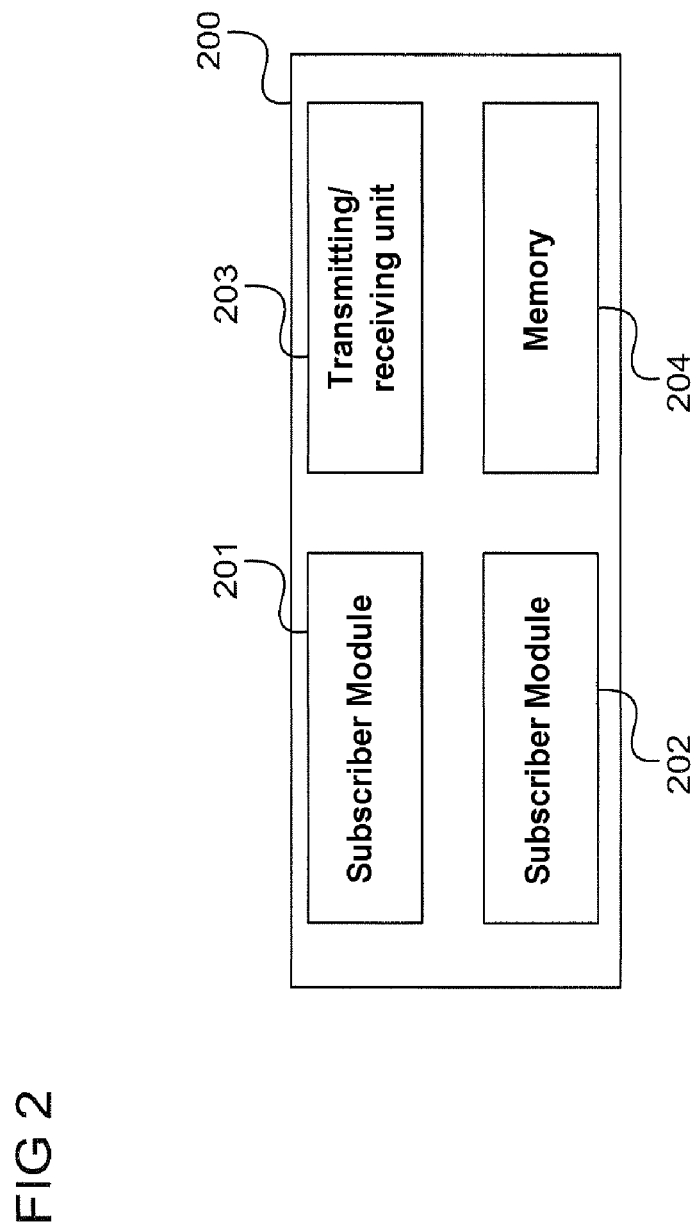
FIG. 2 shows a communication terminal according to one embodiment.

FIG. 2 shows a communication terminal 200 according to one embodiment.

The communication terminal 200 corresponds e.g. to the communication terminal 111 of the communication system 100 shown in FIG. 1.

In this example, the communication terminal 200 has a first subscriber module 201 and a second subscriber module 202. For example, the first communication network is a GSM (Global System for Mobile Communication) network and the first subscriber module 201 is a SIM (Subscriber Identity Module) which enables the communication terminal 200 to communicate by means of the first communication network. Analogously, the second communication network can be a GSM network and the second subscriber module 202 can be a SIM which enables the communication terminal 200 to communicate by means of the second communication network. The subscriber modules 201, 202 can also be subscriber modules according to other communication technologies or communication network standards. For example, one of the subscriber modules can be a USIM (Universal Subscriber Identity Module) if one of the communication networks is a UMTS (Universal Mobile Telecommunications System) network. The subscriber modules 201, 202 can be implemented by means of corresponding chip cards, e.g. as SIM cards which are inserted or installed in the communication terminal 200 by the user.

The communication terminal 200 has a transmitter/receiver (e.g. transceiver) which enables it to receive data from the communication networks and send data to the communication networks, i.e. exchange data with the first base station 101 and the third base station 106.

The communication terminal 200 can have more than one transmitter/receiver (e.g. transceiver) such that it supports simultaneous reception of messages from the first communication network, i.e. from the first base station 101 and from the second communication network, i.e. from the second base station 106. This enables the communication terminal 200 to receive, for example, paging messages from both communication networks which are simultaneously transmitted to the communication terminal 200. In this manner, it is possible to guarantee, for example, that the communication terminal 200 can be reached by incoming call requests, i.e. can be informed in the case of an incoming call request even if the transmission of a paging message by a communication network overlaps the data transmission by the other communication network. However, operating a plurality of transmitter/receiver (e.g. transceiver)s in the communication terminal 200 leads to a higher power consumption than with only one transmitter/receiver (e.g. transceiver) and thus, for example, leads to a shorter operating life with one battery charge, i.e. the communication terminal 200 must be charged up more frequently if it uses a number of transmitter/receiver (e.g. transceiver)s than if it uses only one transmitter/receiver (e.g. transceiver).

In one embodiment, the communication terminal 200 has precisely one (single) transmitter/receiver (e.g. transceiver) 203 or is operated in such a manner that only one transmitter/receiver (e.g. transceiver) 203 is always simultaneously in operation. If, however, in the case of overlapping data transmissions from the first communication network and the second communication network, only the paging messages from one communication network are received for example in the case of overlapping paging messages, this can lead to the communication terminal 200 not being available for the other communication network, i.e. it can lead to the communication terminal 200 not being reached by incoming call requests via the other communication network. In other words, a communication terminal which only receives data from one communication network, can be unavailable for the other communication network in a particular geographic area although the geographic area is covered by both communication networks.

According to one embodiment, a communication terminal is provided which enables first data to be received from a first communication network e.g. from a first network communication facility such as, for example, the first base station 101 and second data to be received from a second communication network, e.g. from a second network communication facility such as, for example, the third base station 106 although it is only equipped with one transmitter/receiver (e.g. transceiver) and although the transmission of the first data overlaps at least partially with the transmission of the second data.

Figure 3:
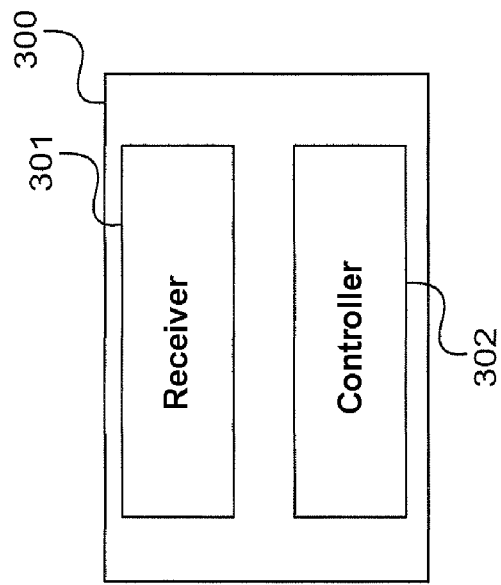
FIG. 3 shows a communication terminal according to one embodiment.

A possible embodiment of the communication terminal according to this embodiment is shown in FIG. 3.

FIG. 3 shows a communication terminal 300 according to one embodiment.

The communication terminal 300 has a receiver 301 which is configured to receive data via a first communication channel or via a second communication channel.

Furthermore, the communication terminal 300 has a controller 302 which is configured to control the receiver 301 in such a manner that the receiver 301 receives a part of first data from a first network communication facility of a first communication network by means of the first communication channel in a first part of a period in which the transmission of the first data by the first network communication facility overlaps the transmission of the second data by the second network communication facility and that the receiver 301 receives a part of the second data from the second network communication facility by means of the second communication channel during a second part of the period so that the first part of the period and the second part of the period do not overlap and so that the part of the first data which is received in the first part of the period meets a predetermined criterion.

To illustrate, data for a first part of a period in which the transmission of two communication networks overlaps are received by the first communication network and, if the received data meet a particular criterion, for example are sufficient for the terminal to obtain the desired information, data are received from the second communication network in a second part of the period. For example, the receiver, if the criterion is met, is switched from a first communication channel which is used by the first communication network for the transmission of the data, to a second communication channel which is used by the second communication network for the transmission of the data.

If only a part of the data which are transmitted from the first communication network or from the second communication network, respectively, are received in this manner, the criterion can be selected, for example, in such a manner that at least a reconstruction of the first data from the received part is possible. For example, a paging message can be reconstructed from the signals which have been received only during a part period of the transmission of the paging message. Thus, the simultaneous availability in both communication networks can be improved, for example in the case of good receiving conditions and in the standby state of the communication terminal.

For example, the communication terminal also has a decoder which is configured to reconstruct the first data from the part of the first data.

The communication terminal can also have a decoder which is configured to reconstruct the second data from the part of the second data.

The first data are, for example, control data of the first communication network.

The second data are, for example, control data of the second communication network.

The criterion is, for example, that the part of the first data is sufficient for reconstructing the first data.

The criterion can also be that the data volume of the part of the first data is above a predetermined threshold value, for example a particular amount of the first data has been received successfully (e.g. without errors).

According to one embodiment, the first data are transmitted via the first communication channel and the second data are transmitted via the second communication channel by using different radio resources. For example, the first data are transmitted via the first communication channel and the second data are transmitted via the second communication channel by using different frequency ranges. Accordingly, the receiver is configured, for example, to receive the data by using different radio resources, e.g. frequencies or frequency ranges.

For example, the first data are (i.e. form) a paging message of the first communication network and the second data are (i.e. form) a paging message of the second communication network.

The first part of the period precedes, for example, the second part of the period. In other words, for example, first one part of the first data is received and then, when the criterion is met, the receiver is switched to receiving the second data, for example adjusted to the second communication channel, e.g. by adjusting a carrier frequency.

According to one embodiment, the controller is also configured to control the receiver, when the part of the second data meets a further predetermined criterion, in such a manner that the receiver receives a part of the fourth data in a first part of the further period in a further period in which the transmission of third data from the first network communication facility overlaps the transmission of fourth data from the second network communication facility and receives a part of the third data in a second part of the further period so that the first part of the further period and the second part of the further period do not overlap and so that the first part of the further period precedes the second part of the further period.

In other words, for example, when the received part of the second data meets a further criterion, for example when the received part of the second data is not sufficient for reconstructing the second data, "the order is reversed" in the next transmission, that is to say in the overlapping transmission of third data from the first communication network and of fourth data from the second communication network, first a part of the fourth data is received from the second communication network before a part of the third data is received from the first communication network. For example, if the received part of a message from the second communication network is not sufficient for reconstructing a message, receiving is begun during the next transmission of the message even if the transmission overlaps the transmission of data by the first communication network.

The further predetermined criterion is thus, for example, that the part of the second data is not sufficient for reconstructing the second data or that the received part is below a predetermined data volume threshold value with regard to the received volume of data.

The first communication network is, for example, a GSM communication network, a UMTS communication network or an LTE communication network. Analogously, the second communication network is, for example, a GSM communication network, a UMTS communication network or an LTE communication network.

Figure 4:
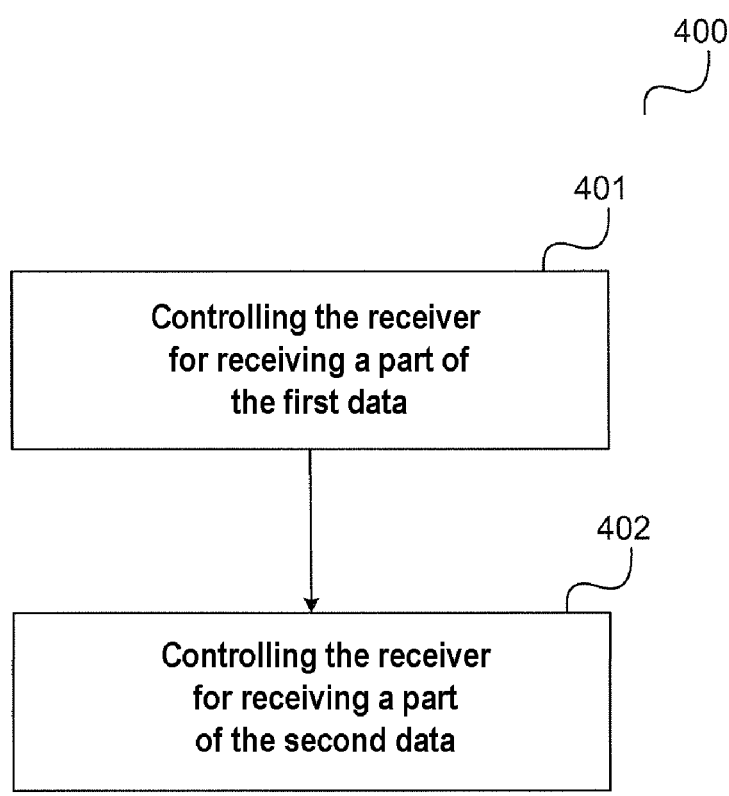
FIG. 4 shows a flow chart according to one embodiment.

The communication terminal 300 executes, for example, the method shown in FIG. 4.

FIG. 4 shows a flow chart 400 according to one embodiment.

The flow chart illustrates a method for receiving data by means of a receiver.

In 401, the receiver is controlled so that the receiver receives a part of first data from a first network communication facility of a first communication network by means of the first communication channel in a first part of a period in which the transmission of the first data by the first network communication facility overlaps the transmission of the second data by the second network communication facility.

In 402, the receiver is controlled so that the receiver receives a part of the second data from the second network communication facility by means of the second communication channel during a second part of the period so that the first part of the period and the second part of the period do not overlap and so that the part of the first data which is received in the first part of the period meets a predetermined criterion.

According to one embodiment, a computer program product is provided which has instructions which, when they are executed by a processor, have the effect that the processor executes the method described with reference to FIG. 4.

Embodiments which are described in conjunction with the communication terminal analogously apply to the method for receiving data and to the computer program product.

In the text which follows, an example of the transmission of first data and second data in an overlapping period is described with reference to FIG. 5.

Figure 5:
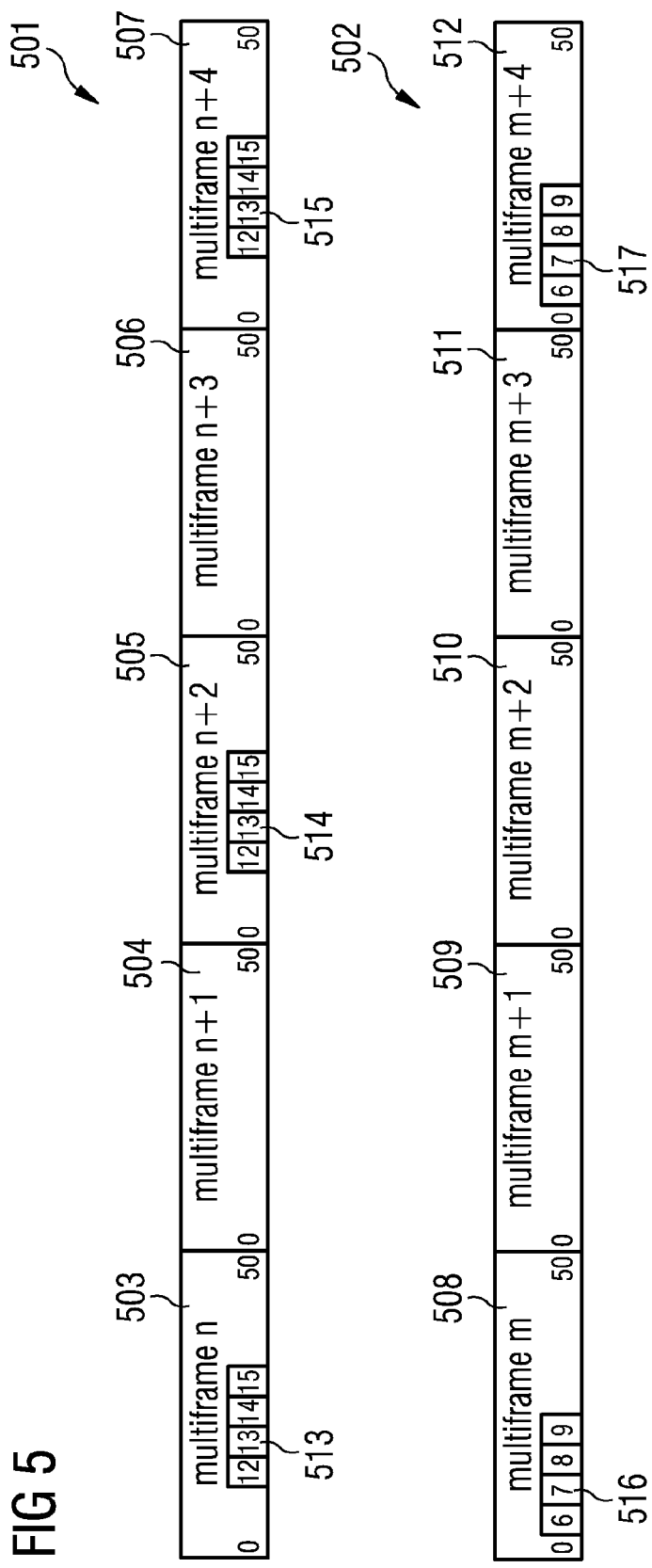
FIG. 5 shows a framing diagram according to one embodiment.

FIG. 5 shows a framing diagram according to one embodiment.

In this example, it is assumed that the first base station 101, which operates the first radio cell 103, transmits data in accordance with a first framing structure 501 and that the third base station 106 which operates the third radio cell 108 transmits data in accordance with a second framing structure 502.

In accordance with the framing structures 501, 502, data are transmitted in a plurality of multiframes 503 to 512 which, in the present example, in each case have 51 (radio) frames which are in each case numbered through from 0 to 50.

It is assumed that the first data which are transmitted by the first base station 101 are transmitted in each second multiframe 503, 505, 507 of the first framing structure 501, more precisely in the frames having numbers 12 to 15 of each second multiframe 503, 505, 507 which thus form transmission periods 513 to 515 for the first data. Furthermore, it is assumed that the second data which are transmitted by the third base station 106 are transmitted in each fourth multiframe 508, 512 of the second frame structure 502, more precisely in the frames having numbers 6 to 9 of each fourth multiframe 503, 505, 507 which thus form transmission periods 516, 517 for the second data.

As shown in FIG. 5, it is also assumed in this example that the first frame structure 501 is displaced with respect to the second frame structure 502 in such a manner that, for example, a first transmission period 513 for the first data overlaps a second transmission period 516 for the second data.

Thus, the period which consists of the first transmission period 513 and the second transmission period 516 or also the period of overlap of the first transmission period 513 and of the second transmission period 516 can be seen as transmission period in which the transmission of the first data overlaps the transmission of the second data.

It is assumed in this example that the transmission periods 513 to 517 in each case have four successive frames. The four frames of the first transmission period 513 and the four frames of the second transmission period 516 can overlap in various ways. Examples will be described with respect to FIGS. 6A to 6D in the text which follows.

FIG. 6A to FIG. 6D show framing diagrams 601 to 608 according to one embodiment.

In this example, the framing diagrams 601, 603, 605 and 607 show the frames which correspond to the first transmission period 513 and the framing diagrams 602, 604, 606 and 608 show the frames which correspond to the second transmission period 516.

Each of the framing diagrams 601 to 608 show frames which are numbered through from n to n+3 for the first transmission period 513 and from m to m+3 for the second transmission period 516. In this example, each frame has 8 time slots which are in each case numbered through from 0 to 7.

In this embodiment, the first data and the second data are transmitted in bursts. Especially, it is assumed that the first data are only transmitted in the time slots having number 0 of the frames of the framing diagrams 601, 603, 605, 607 which correspond to the first transmission period 513 and that the first data are only transmitted in the time slots having number 0 of the frames of the framing diagrams 602, 604, 606, 608 which correspond to the second transmission period 516 as is indicated by the crosshatch of the time slots having number 0.

As is shown, the transmission of the first data thus overlaps at least partially the transmission of the second data.

In the text which follows examples are explained how the communication terminal 200 receives the first data and the second data at least partially.

The sequence is explained with reference to FIG. 7.

Figure 7:
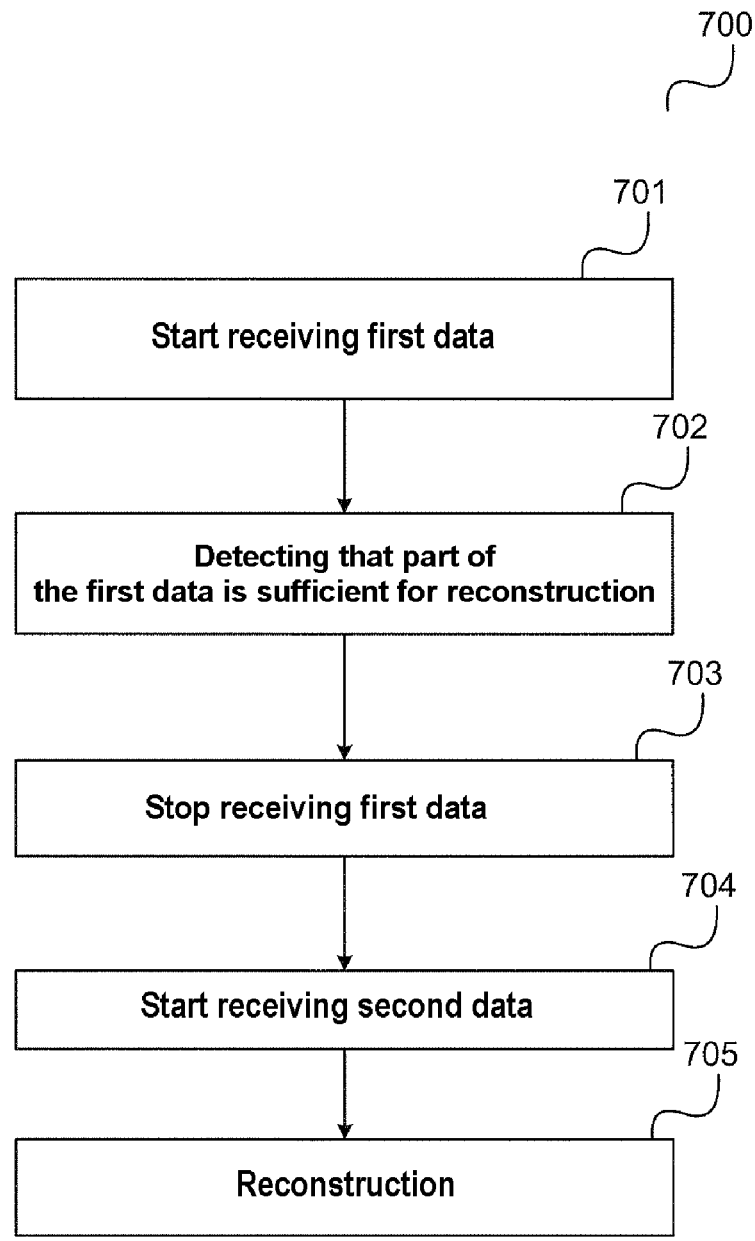
FIG. 7 shows a flow chart according to one embodiment.

FIG. 7 shows a flow chart 700 according to one embodiment.

Figure 6A:
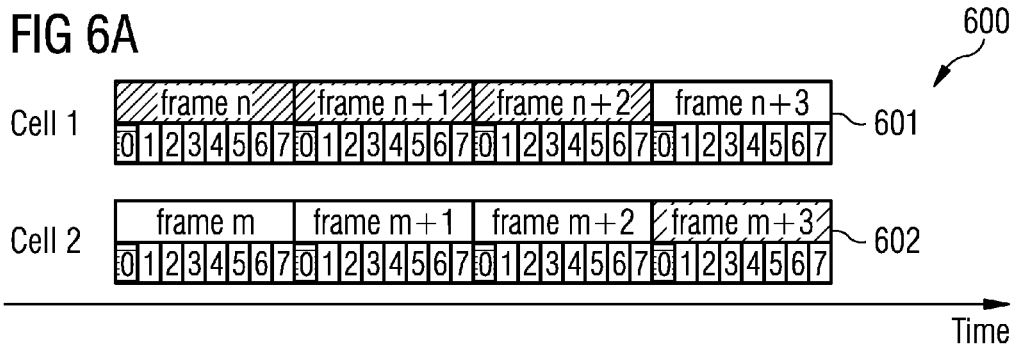
FIG. 6A to FIG. 6D show framing diagrams according to one embodiment.

Firstly, the sequence is explained in the example according to FIG. 6A. In this case, the time slots having number zero of the frames of the first framing diagram 601 partially overlap the timeslots having number zero of the frames of the second framing diagram 602.

In this case, the communication terminal 200 sets its transmitter/receiver (e.g. transceiver) to the reception of data from the first communication network in 701, for example in accordance with a first communication channel, and starts receiving the first data.

In 702, the communication terminal 200 detects when the part of the first data which has been received meets a predetermined criterion, in this example whether the part of the first data which has been received is sufficient for reconstructing the block of the first data which are transmitted in the frames of the first framing diagram 601.

In this example, it is assumed that the part of the first data which has been received in the frames having numbers n, n+1 and n+2 is sufficient for reconstructing the first data (as indicated by the slanted shading in the first framing diagram 601).

Thereupon, reception of the first data is stopped in 703 and the transmitter/receiver (e.g. transceiver) 203 is set to the reception of data from the second communication network, for example in accordance with a second communication channel, and reception of the second data is started.

The second data are received, for example, until the end of the second transmission period or are received until a further criterion is met, for example until the part of the second data which have been received is sufficient for reconstructing the block of the second data which are transmitted in the frame of the second framing diagram 602. In this example, the part of the second data which is transmitted in the frame having number m+3 of the second framing diagram 602 is received (as indicated by the slanted hatching in the second framing diagram 602).

In this connection it should be noted that the data which are transmitted in only one multiframe 503, 505, 507 (for example a message) and the data which are transmitted in a number of the multiframes 503, 505, 507 (for example several messages) can be considered as first data. Analogously, the data which are transmitted in only one multiframe 508, 512 (for example a message) and the data which are transmitted in two multiframes 508, 512 (for example a number of messages), can be considered as second data.

Figure 6B:
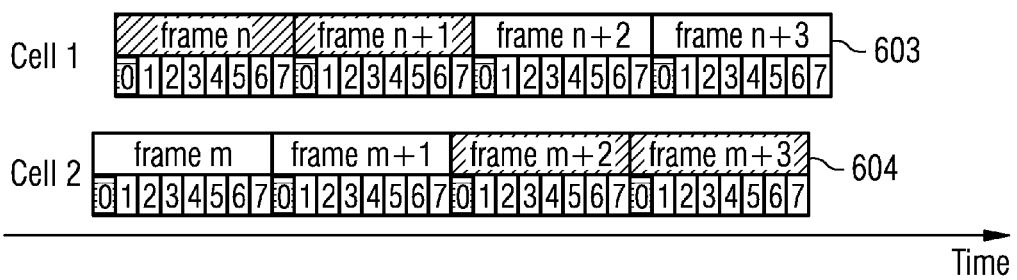

In the example according to FIG. 6B, the time slots having number zero of the frames of the third framing diagram 603 also partially overlap the time slots having number zero of the frames of the fourth framing diagram 604.

In this case, the communication terminal 200 sets its transmitter/receiver (e.g. transceiver) to the reception of data from the first communication network in 701, for example in accordance with a first communication channel, and starts receiving the first data.

In 702, the communication terminal 200 detects when the part of the first data which has been received meets a predetermined criterion, in this example whether the part of the first data which has been received is sufficient for reconstructing the block of the first data which are transmitted in the frames of the third framing diagram 603.

In this example, it is assumed that the part of the first data which has been received in the frames having numbers n, n+1, is sufficient for reconstructing the first data (as indicated by the slanting shading in the third framing diagram 603).

Thereupon, reception of the first data is stopped in 703 and the transmitter/receiver (e.g. transceiver) 203 is set to the reception of data from the second communication network in 704, for example in accordance with a second communication channel, and reception of the second data is started.

The second data are received, for example, until the end of the second transmission period or are received until a further criterion is met, for example until the part of the second data which have been received is sufficient for reconstructing the block of the second data which are transmitted in the frame of the fourth framing diagram 604. In this example, the part of the second data which is transmitted in the frames having numbers m+2 and m+3 of the fourth framing diagram 604 is received (as indicated by the slanted shading in the fourth framing diagram 604).

Figure 6C:
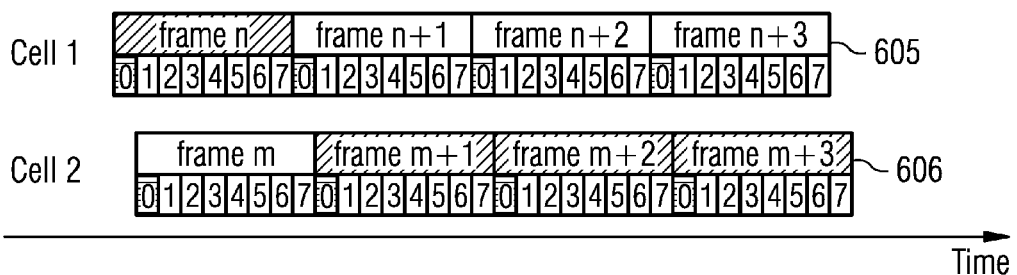

In the example according to FIG. 6C, the time slots having number zero of the frames of the fifth framing diagram 605 also partially overlap the time slots having number zero of the frames of the sixth framing diagram 606.

In this case, the communication terminal 200 sets its transmitter/receiver (e.g. transceiver) to the reception of data from the first communication network in 701, for example in accordance with a first communication channel, and starts receiving the first data.

In 702, the communication terminal 200 detects when the part of the first data which has been received meets a predetermined criterion, in the present example whether the part of the first data which has been received is sufficient for reconstructing the block of the first data which are transmitted in the frames of the first framing diagram 601.

It is assumed in this example that the part of the first data which has been received in the frame having number n is sufficient for reconstructing the first data (as indicated by the slanted shading in the fifth framing diagram 605).

Thereupon, the reception of the first data is stopped in 703 and the transmitter/receiver (e.g. transceiver) 203 is set to the reception of data from the second communication network in 704, for example in accordance with a second communication channel, and the reception of the second data is started. The second data are received, for example until the end of the second transmission period or are received until a further criterion is met, for example until the part of the second data which have been received is sufficient for reconstructing the block of the second data which have been transmitted in the frame of the sixth framing diagram 606. In this example, the part of the second data which is transmitted in the frames having numbers m+1, m+2 and m+3 of the second framing diagram 602 is received (as indicated by the slanted shading in the sixth framing diagram 606).

Figure 6D:
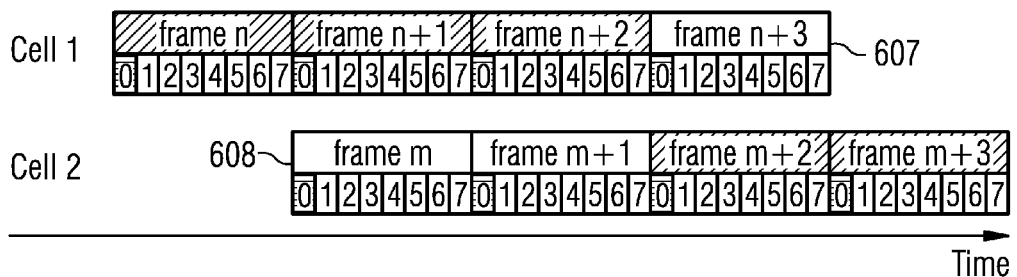

In the example according to FIG. 6D, the time slots having number zero of the frames having the frames n+1, n+2 and n+3 of the seventh framing diagram 607 partially overlap the time slots having number zero of the frames having the numbers m, m+1 and m+2 of the eighth framing diagram 608. This example is representative of other constellations in which fewer than four frames of a block of one network overlap the frames of a block of the other network.

In this case, the communication terminal 200 sets its transmitter/receiver (e.g. transceiver) to the reception of data from the first communication network in 701, for example in accordance with a first communication channel, and starts receiving the first data.

In 702, the communication terminal 200 detects when the part of the first data which has been received meets a predetermined criterion, in the present example whether the part of the first data which has been received is sufficient for reconstructing the block of the first data which are transmitted in the frames of the seventh framing diagram 601 (as indicated by the slanted shading in the seventh framing diagram 607).

It is assumed in this example that the part of the first data which has been received in the frames having numbers n, n+1 and n+2 is sufficient for reconstructing the first data.

Thereupon, reception of the first data is stopped in 703 and the transmitter/receiver (e.g. transceiver) 203 is set to the reception of data from the second communication network in 704, for example in accordance with a second communication channel, and the reception of the second data is started.

The second data are received, for example, until the end of the second transmission period or are received until a further criterion is met, for example until the part of the second data which have been received is sufficient for reconstructing the block of the second data which are transmitted in the frame of the eighth framing diagram 608. In this example, the part of the second data which is transmitted in the frames having numbers m+2 and m+3 of the eighth framing diagram 608 is received (as indicated by the slanted shading in the eighth framing diagram 608).

As explained above, the criterion which decides on whether to switch from receiving the first data to receiving the second data can be that the received part of the first data is sufficient for reconstructing the first data. Whether the part of the data is sufficient can depend, for example, on the quality with which the part of first data has been received.

If the part of the first data is sufficient for reconstructing the first data, the first data are reconstructed in 705 on the basis of the part of the first data. Analogously, the second data can be reconstructed from the part of second data if they are sufficient for reconstruction.

Data from a part of data can be reconstructed in various manners. If the data are, for example, a paging message and the communication network is a GSM communication network, the fact can be utilized that in the case of GSM transmission technology, the paging messages are transmitted in four bursts of approx. 577 μs at intervals of approx. 4.615 ms. In this case, the data information is transmitted redundantly with a Viterbi Codec of rate 1/2, i.e. two coded bits are transmitted per data bit. Since the coded bits are distributed over all burst (interleaving), the data bits can be reconstructed from fewer than four bursts. In this process, values of between 0 and 1 are assumed for the unknown bits. By this means, a paging message of which only data from fewer than four bursts are received can be reconstructed and in this manner, as just explained, paging messages of several networks can be received and reconstructed even if their transmission overlaps.

In the text which follows, it is explained more accurately as an example how a dummy paging message according to GSM can be recognized from the first burst only, and thus be reconstructed, by using a method known per se. In one embodiment, this method is generalized in order to recognize a dummy paging message from any burst. By these means, a dummy paging message from the second communication network can be recognized from the received burst of the frame having the number m+3, for example in accordance with FIG. 6A. The payload data of a dummy paging message has 6 bytes and the further 17 bytes are filled up with the hexadecimal value of 2B. The byte having index 3 is the "page mode" which is designated by "M". There are four types of page modes: 0, 1, 2 and 3.

If "M" is zero, the dummy paging message can be ignored by the communication terminal 200.

Most of the time, the base station transmits dummy paging messages in a GSM communication network "M" being equal to 0. In the text which follows, it is described how such a paging message can be recognized already after one burst and thus, for example, reception can be stopped after just receiving the paging message in only one time slot, and it is possible to switch to receiving the data from the other communication network.

For sending a dummy paging message, 456 bits are divided into four 114-bit bursts after the scrambling. The first burst, which will also be called Burst0 in the further text, can also be called line vector burst0($n$), where n=1, 2, . . . 113. The elements of Burst0(n) can be combined to form one vector a which has 88 elements (bits) of burst0(n), and one vector b which has 26 bits of the vector burst0(n). In concrete terms, a is defined according to
a=Burst0(0,1,2,3,4,5,6,8,9,10,13,15,17,18,19,20,22,23,24, 25,27,29,31,32,33,34,36,37,38,39,41,43,44,45,46,47, 48,50, 51,52,53,54,55,57,58,59,60,61,62,64,66,67,68,69,71,72,73, 75,76,78,80,81,82,83,85,86,87,88,89,90,9 2,94,95,96,97,99, 100,101,102,103,104,105,106,108,109,110,111,113) and b is defined according to
b=Burst0(7,11,12,14,16,21,26,28,30,35,40,42,49,56,63,65, 70,74,77,79,84,91,93,98,107,112).

The 88-bit-long vector a should read as follows
a1=[10100000101110100100000000010011110100100000 10100000011111000000100 000000110111101000000], and the
26-bit-long vector should be equal to one of the following vectors if "M" is equal to 0:
b1=[00100000100011011011010100], and
b2=[01110101101000000110000001].

Vectors a1, b1 and b2 are stored in a memory 204 of the communication terminal 200 so that they can be used for a comparison when the communication terminal 200 receives the first burst of a paging message.

To detect a dummy paging message, the 114 values of the quantized first burst are replaced by ones and zeros, for example, in a first step. If the 114 elements of the first burst designated by vector RBurst0(n), are N-bit-quantized and vary between $(-2^{N-1})$ and $(-2^{N-1}-1)$ after the Viterbi equalizer, all negative elements are replaced by 1, for example, and all elements which are positive or equal to zero are replaced by 0. Following this, the elements, thus replaced, of the RBurst0(n) vector are compared with the stored elements of a1, b1 and b2 and the probability of a correspondence is determined. For example, in the case of a correspondence in a number of elements which is above a particular threshold value (in each case for a1 and b1 or b2, respectively) it is decided that a dummy paging message with page mode 0 is present. If the correspondence is not adequate (e.g. the number of corresponding elements is below the threshold value), the further bursts of the paging message will be received, for example.

According to a further method, known per se, a paging message, which does not need to be noted by the terminal and has been decoded, can be decoded again and used for being compared with incoming parts beginning with the first burst of paging messages so that it is possible to decide already on the basis of a received part of a paging message whether the paging message can be ignored by the terminal. In one embodiment, this method is generalized in order to recognize a dummy paging message from any bursts. Thus, a dummy paging message from the second communication network can be recognized from the bursts of frames m+2 and m+3, for example according to FIG. 6B.

In other cases, too, the first data can be reconstructed by methods known per se from the part of first data beginning with the first burst if the first data have not been received completely. In one embodiment, this method is generalized for recognizing a paging message of any bursts. By these means, a paging message from the second communication network can be recognized from the bursts of frames m+2 and m+3, for example according to FIG. 6B. A paging message which is not necessarily a dummy paging message can be reconstructed, for example on the basis of the structure of the coding used and of the scrambling scheme, by the communication terminal from, for example, fewer than four bursts if the transmission quality is good and, in addition to the missing data, not too many transmission errors are thus present. For this purpose, the missing bits (which have not been received) can be treated in such a manner as if they have been omitted by the base station (i.e. deleted or not transmitted). For these bits, special values (so-called "erasures") are used which are recognized as missing bits by the Viterbi decoder and which are given no weight in the decoding process. To illustrate, this decoding can be considered as an error correction of the missing bits which is successful depending on the error correctability of the code used, which is typically dependent on the code rate. After the decoding, it is possible to check, for example by means of the parity bits, whether it was possible to reconstruct the message correctly or whether further parts of the message (e.g. further bursts) have to be received in order to be able to decode the message.

According to the embodiments explained above, a reception of paging messages overlapping in time from two GSM communication networks is possible, for example. In one embodiment, the communication terminal has two SIM cards of the same GSM communication network (i.e., for example, also two telephone numbers) and, analogously to the above embodiments, can receive paging messages of this communication network which overlap in time (i.e. the transmission of which overlaps in time) and which are transmitted via different channels.

According to one embodiment, an extension is provided which provides for the simultaneous reception of paging messages overlapping in time from more than two communication networks. If, for example, the transmission of three paging messages overlaps, a part of a first paging message can be received first, analogously to the procedure described above, until the received data volume is sufficient for reconstructing the first paging message, then a part of a second paging message can be received until the received data volume is sufficient for reconstructing the second paging message and finally a part of the third paging message can be received.

The procedure described above can also be applied to different messages, e.g. to the reception of paging messages and system information messages or cell broadcast messages of one or more communication networks, e.g. GSM communication networks, the transmission of which overlaps.

Furthermore, the procedure described above can be used for receiving messages in different operating states of the terminal, e.g. for receiving paging messages in a standby state with respect to a SIM card and messages during the dedicated transmission, e.g. in the call state with respect to another SIM card, the transmission of which overlaps.

In addition, embodiments are not restricted to the application to GSM communication networks but can also be applied for communication networks of other standards such as UMTS, LTE (Long Term Evolution) etc.

Although the invention has been shown and described mainly with reference to particular embodiments, those who are familiar with the technical field should understand that numerous changes can be carried out with respect to design and details without deviating from the essence and field of the invention as defined by the claims which follow. The range of the invention is therefore determined by the attached claims and it is intended that all changes coming within the literal sense or the range of equivalence of the claims are comprised.

What is claimed is:

1. A communication terminal, comprising:
    a receiver configured to receive data via one of a group comprising a first communication channel and a second communication channel, at a time; and
    a controller configured, during a time period in which a first transmission comprising a first data overlaps with a second transmission comprising a second data, to control the receiver
    to receive a portion less than all of the first transmission from a first network communication facility of a first communication network via the first communication channel in a first part of the time period; and to receive a portion less than all of the second transmission from the second network communication facility via the second communication channel during a second part of the time period, wherein data received in the portion less than all of the first transmission during the first part of the time period is sufficient for reconstructing the first data;

wherein the first part of the time period and the second part of the time period do not overlap with one another.

2. The communication terminal as claimed in claim 1, further comprising:
 a decoder configured to reconstruct the first data from the data from the portion less than all of the first transmission.

3. The communication terminal as claimed in claim 1, further comprising:
 a decoder which is configured for reconstructing the second data from data received from the portion less than all of the second transmission.

4. The communication terminal as claimed in claim 1, wherein the first data are control data of the first communication network.

5. The communication terminal as claimed in claim 1, wherein the second data are control data of the second communication network.

6. The communication terminal as claimed in claim 1, wherein the controller controls the receiver to meet a criterion that the data from the portion less than all of the first transmission is sufficient for reconstructing the first data.

7. The communication terminal as claimed in claim 1, wherein the first transmission comprising the first data are transmitted via the first communication channel and the second transmission comprising the second data are transmitted via the second communication channel by using different radio resources.

8. The communication terminal as claimed in claim 1, wherein the first transmission comprising the first data are transmitted via the first communication channel and the second transmission comprising the second data are transmitted via the second communication channel by using different frequency ranges.

9. The communication terminal as claimed in claim 1, wherein the first data are a paging message of the first communication network and the second data are a paging message of the second communication network.

10. The communication terminal as claimed in claim 1, wherein the first part of the time period precedes the second part of the time period.

11. The communication terminal as claimed in claim 10, wherein the controller is further configured to control the receiver, when the data received from the portion less than all of the second transmission comprising the second data is not sufficient for reconstructing the second data, to receive a portion less than all of a fourth transmission comprising a fourth data in a first part of a subsequent time period, wherein during the subsequent time period a third transmission comprising third data from the first network communication facility overlaps with the fourth transmission comprising fourth data from the second network communication facility, and the controller is further configured to control the receiver to receive a portion less than all of the third transmission in a second part of the subsequent time period so that the first part of the subsequent time period and the second part of the subsequent time period do not overlap with one another and so that the first part of the further period precedes the second part of the further period.

12. The communication terminal as claimed in claim 11, wherein the controller controls the receiver to meet a predetermined criterion is that the data received from the portion less than all of the second transmission is not sufficient for reconstructing the second data.

13. The communication terminal as claimed in claim 1, wherein the first communication network is a GSM communication network, a UMTS communication network or an LTE communication network.

14. The communication terminal as claimed in claim 1, wherein the second communication network is a GSM communication network, a UMTS communication network or an LTE communication network.

15. The communication terminal as claimed in claim 1, wherein the first data is a message of the first communication network and the second data is a message of the second communication network.

16. The communication terminal as claimed in claim 1, wherein during the time period, the controller controls the receiver to switch from receiving data from the first communication channel to receiving data from the second communication channel, or the controller controls the receiver to switch from receiving data from the second communication channel to receiving data from the first communication channel.

17. A method for receiving data by means of a receiver, the method comprising:
 controlling the receiver, during a time period in which a first transmission comprising a first data overlaps with a second transmission comprising a second data, to:
  receive a portion less than all of the first transmission from a first network communication facility of a first communication network via a first communication channel in a first part of the time period; and
  receive a portion less than all of the second transmission from the second network communication facility via a second communication channel during a second part of the time period;
 wherein data received in the portion less than all of the first transmission during the first part of the time period is sufficient for reconstructing the first data;
 wherein the first part of the time period and the second part of the time period do not overlap with one another; and
 wherein the receiver is configured to receive data via one of a group comprising the first communication channel and second communication channel, at a time.

18. A non-transitory computer program product which has instructions which, when they are executed by a processor, have an effect that the processor carries out a method for receiving data by means of a receiver, the method comprising:
 controlling the receiver, during a time period in which a first transmission comprising a first data overlaps with a second transmission comprising a second data, to
  receive a portion less than all of the first transmission from a first network communication facility of a first communication network via a first communication channel in a first part of the time period; and
  receive a portion less than all of the second transmission from the second network communication facility via a second communication channel during a second part of the time period,
 wherein data received in the portion less than all of the first transmission during the first part of the time period is sufficient for reconstructing the first data;
 wherein the first part of the time period and the second part of the time period do not overlap with one another, wherein the receiver is configured to receive data via one of a group comprising the first communication channel and second communication channel, at a time.

19. A communication terminal, comprising:
- a receiver configured to receive data via one of a group comprising a first communication channel and a second communication channel, at a time; and
- a controller configured, during a time period in which a first transmission comprising a first data overlaps with a second transmission comprising a second data, to control the receiver
- to receive a portion less than all of the first transmission from a first network communication facility of a first communication network via the first communication channel in a first part of the time period; and
- to receive a portion less than all of the second transmission from the second network communication facility via the second communication channel during a second part of the time period, wherein data received in the portion less than all of the first transmission during the first part of the time period is sufficient for reconstructing the first data;

wherein the first part of the time period and the second part of the time period do not overlap with one another, wherein the controller controls the receiver to meet a criterion that the data volume of the data received from the portion less than all of the first transmission is above a predetermined threshold value.

\* \* \* \* \*